C. R. WAGNER.
MANUFACTURE OF NON-ALCOHOLIC BEVERAGES.
APPLICATION FILED MAY 26, 1910.
1,084,833.
Patented Jan. 20, 1914.
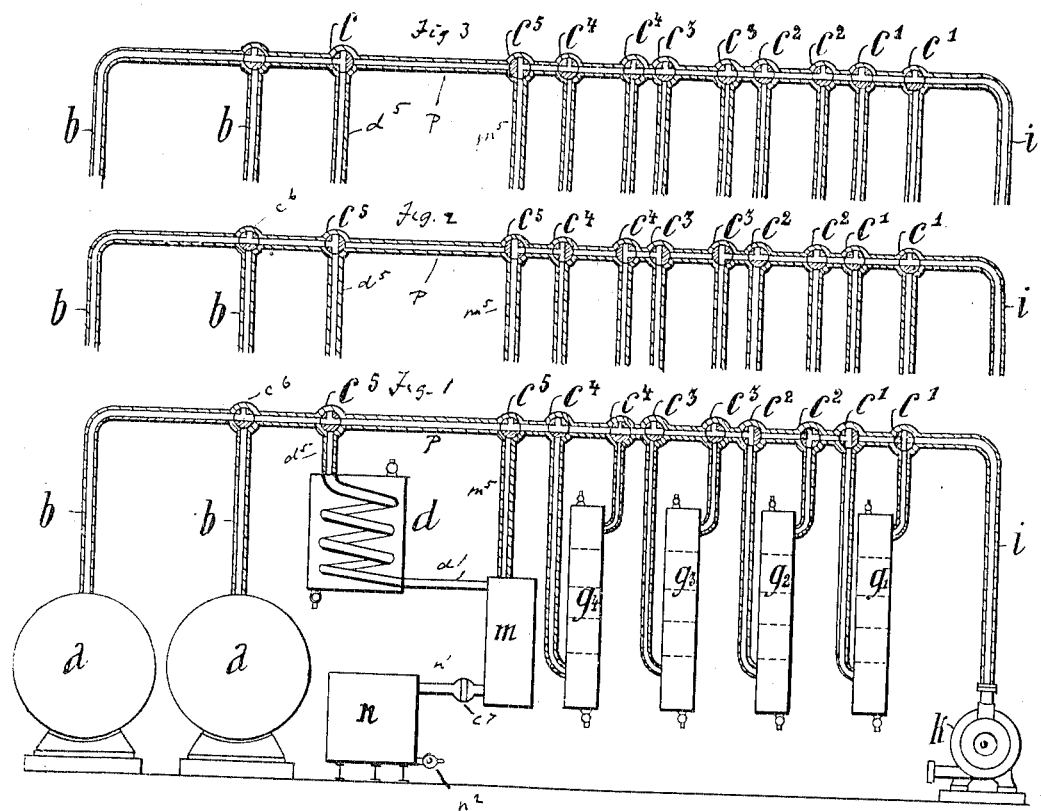
Witnesses:
Inventor:
Carl Reinhard Wagner

UNITED STATES PATENT OFFICE.

CARL REINHARD WAGNER, OF SONNENBERG, NEAR WIESBADEN, GERMANY.

MANUFACTURE OF NON-ALCOHOLIC BEVERAGES.

1,084,833.  Specification of Letters Patent. Patented Jan. 20, 1914.

Application filed May 26, 1910. Serial No. 563,650.

*To all whom it may concern:*

Be it known that I, CARL REINHARD WAGNER, a subject of the German Emperor, and resident of Sonnenberg, near Wiesbaden, Germany, have invented new and useful Improvements in the Manufacture of Non-Alcoholic Beverages, of which the following is a specification.

My invention relates to the manufacture of beverages free from alcohol, and, in particular, to the manufacture of such beverages from alcoholic beverages by extracting therefrom the alcohol and preserving the aromatic properties thereof.

The objects of my invention are to produce these beverages in such a way that losses of the valuable aromatic substances existing in the alcoholic beverage are avoided to the greatest possible extent and the resultant product, while free from alcohol, will retain its aromatic properties or " bouquet."

Heretofore methods have been known for removing the alcohol from alcoholic beverages such as wine, but under these methods only a portion of the aromatic substances thereof was preserved and added to the alcohol-free beverage to be prepared. In employing these known methods it has been possible to preserve and utilize only the more volatile aromatic substances, namely those volatilizing below the boiling point of ethyl-alcohol, while those distilling over with the alcohol were lost.

My invention is designed to overcome this objection and with this end in view it comprises a method whereby the volatile aromatic products are collected in separate vessels or receivers at successive stages of the distilling and separating operation and are then united in an alcohol-free liquor to form the non-alcoholic beverage containing the aromatic substances of the original alcoholic liquid. The alcohol-free liquor to which the aromatic products are thus added may be the residue left after distilling off the aromatic substances and the alcohol under my process, although other alcohol-free liquids may be employed as the recipient of these aromatic products.

My invention also comprises such further features as will be hereinafter set forth and pointed out in the claims.

I will now describe in detail the preferred manner of carrying out my invention.

The new process embraces three stages: In the first stage an alcoholic beverage such as wine, beer or cider is heated to a low temperature in a vessel and the air concurrently evacuated therefrom by a suitable air-pump or exhauster, the temperature being such that only the most volatile and subtle aromatic substances therein are evaporated, that is to say the aromatic substances which volatilize below the point at which alcohol distils over. The aromatic substances thus evaporated are conducted to a receiver or absorption vessel, containing alcohol-free wine mixed with sugar, for example, by which liquid they are absorbed. When sufficient of these aromatic substances have thus been absorbed they are retained in said vessel and reëvaporation thereof is prevented by closing the vessel and cutting it off from communication with the air pump and the still. The pressure in the vessels is to be kept at less than 58 centimeters below atmospheric pressure, as indicated by a mercurial manometer, and the temperature below 45°, centigrade. I have found that under these conditions the more volatile aromatic substances of the alcoholic liquid are evaporated and absorbed in the vessel containing the non-alcoholic absorption liquid and that no alcohol passes over. Under the second stage of the process the vessel in which the volatile aromatic substances have been absorbed being cut off from communication with the distilling vessel, the temperature and the degree of air evacuation are raised to an extent sufficient to evaporate the less volatile aromatic substances which volatilize at a point where the alcohol begins to evaporate. The vapors thus produced are cooled by conducting them through a cooler or condensing vessel to a sufficient extent to condense the alcohol-vapors which flow off to a collecting vessel but not sufficient to condense the aromatic substances carried over with the alcohol, and whose vapors are conducted to and retained in a second receiver or absorption-vessel, also containing a non-alcoholic liquid, as under the first stage. To carry out this stage of the process the vacuum or, more strictly speaking, the reduction of pressure in the vessels employed must register about from 68 to 70 centimeters below atmospheric pressure on a mercurial manometer and the temperature is from 50° to 54°, centigrade. This second stage lasts about one and one-quarter hours, at the end of which time all of the heavier aromatic substances remaining from the first stage of the process will have been received in the second absorption-vessel, as has been demonstrated in practice. At the end of this second stage the second absorption-vessel is also closed and cut off from communication with the air-pump and from the evaporating vessel or still, so that all the aromatic substances are retained in both absorption vessels. In the third stage of the process under my invention the first and second absorption-vessels are kept closed and cut-off from the air-pump and from the still and the residual alcoholic liquid in the still or evaporation vessel is heated sufficiently to drive out and distil the remainder of alcohol therein, the said evaporated alcohol being condensed as under the second stage of the process. The liquids in the first and second absorption-vessels can be drawn-off during the third stage and mixed to obtain an alcohol-free beverage containing all the valuable aromatic substances, including the less volatile substances distilling over with alcohol, and the vessels can then be refilled with a fresh supply of an alcohol-free liquor to be ready to be charged with aromatic vapors as at the beginning of the process.

After the alcohol has been entirely distilled off from the liquid in the still or evaporating-vessel and the absorption vessels have been recharged with fresh alcohol-free liquid as above, the above process can be repeated by connecting a second still or evaporating vessel which may be filled with alcoholic liquor while the distillation from the first still is going on, with the air pump and successively with the first and second recharged absorption-vessels as explained above. The first still is then cut off from communication with the pump and the residue therein which is free from alcohol and aromatic substances may be drained therefrom to permit of recharging the still with alcoholic liquor. The residue thus drained from the still may be used as the liquor to be charged with aromatic substances in the absorption vessels. The third stage of the process is continued until all the alcohol and other volatile substances in the liquid in the still have passed over, and requires from one to one and one-half hours for its completion.

The above cycle of operations can thus be repeated indefinitely and the absorption-vessels and stills can be connected with the air-pump and the operative still and absorption vessel put into communication at the proper time without at any time interrupting the operation of the air-pump or the distilling action. The division of the work into three stages, as explained above, besides leading to this advantage of uninterrupted continuous working also avoids the loss of any aromatic substances.

In the accompanying drawing I have illustrated an apparatus for carrying out my process.

In this drawing: Figure 1 represents a diagrammatic view, partly in vertical section, of said apparatus, and Figs. 2 and 3 similar views of the pipe connections showing the cocks in the position for carrying out the 2nd and 3rd stages of the process, respectively.

In Fig. 1 the apparatus is shown with all the parts in such relation as to carry out the first stage of the process. At $a\,a$ are represented the stills which are adapted to work in rotation or alternately by arranging a three-way cock $c^0$ at the point where the two branch-pipes $b, b$ leading from the two stills $a, a$, join the pipe-main $p$ which is connected with all of the branch piping of the apparatus, as shown. In the position shown in the drawing this three-way cock occupies a position to open the communication between the pipe-main $p$ and the left-hand still, the right hand still being cut off from such communication and out of operation. An exhaust-pump is arranged at $k$ and is adapted to communicate with the pipe-main $p$, and through it with one or the other or both of the stills $a\,a$, by a connecting pipe $i$. Each of the four absorption vessels or cylinders $g_1, g_2, g_3, g_4$, is connected with the pipe-main $p$ by an admission and an exit branch-pipe, as shown, the communication between these branch pipes and the pipe-main $p$ being controlled by three-way cocks, $c^1, c^1, c^2, c^2, c^3, c^3$, and $c^4, c^4$, respectively, these cocks being arranged at the point of junction of the pipe-main and the branch-pipes as shown. At $d$ is represented a cooler or condenser of any suitable construction and arrangement and at $m$ a separator for permitting the uncondensed vapors to separate from the condensed liquid, the separator communicating with the condenser by means of a connecting pipe $d'$ leading from the bottom of the condenser to the top of the separator, as shown. Communication between the condenser and the separator, on the one hand, and the pipe-main, on the other, is effected by branch-pipes $d^5$, and $m^5$, respectively, and these communications are again controlled by a pair of three-way cocks, $c^5\,c^5$, as shown. At $n$ is shown a collecting vessel or receiver into which the condensed liquid accumulating in the separator $m$, may be drained from time to time, by way of the drain-pipe $n^1$, controlled by a cock $c^7$.

As above stated the parts in Fig. 1 are shown in such relation as to carry out the first stage of the process. For this purpose the cocks $c^3, c^3, c^4, c^4, c^5, c^5$, are shown in such a position as to cut off communication between the pipe-main $p$, on the one hand, and the absorption vessels $g_3$ and $g_4$ and the condenser $d$ and separator $m$, on the other, and to leave an open passage through the pipe-main at the points where these cocks are situated. The cock $c^6$ is moreover, so constructed and in such a position as to cut off one of the stills $a$ from the pipe-main and to simultaneously open the other to the said main. Under these conditions, when the still in communication with the pipe-main is charged with the alcoholic liquid to be de-alcoholized and heated to the proper point as above stated for the first stage of the process, and the exhaust pump is operated to produce the rarefaction necessary for this first stage, the more volatile aromatic substances will vaporize and pass through the absorption vessels $g_2$ and $g_1$ by way of the cocks $c^2$ $c^2$ and $c^1$. These vessels, being charged with the alcohol-free liquid, as above explained, will serve to retain said aromatic substances in said liquids.

When the more volatile aromatic substances have distilled over, and have been absorbed in the absorption vessels $g_2$, $g_1$, the cocks are set as indicated in Fig. 2, whereupon the second stage of the process will be carried out, the heat of the still and the degree of rarefaction being raised as above explained. The less volatile aromatic substances together with a portion of the alcohol now pass into the pipe-main and thence first into the condenser $d$ and then into the separator where the liquefied alcohol remains, the vapors of aromatic substances escaping therefrom and passing by way of the connecting pipe $m^5$ and the pipe-main $p$ into the second set of absorption-vessels $g_4$ and $g_3$ as will be obvious. These aromatic vapors are retained in the non-alcoholic liquid with which these absorption vessels are charged as above explained. During this second stage no aromatic products can escape from the first set of absorption vessels as they are cut off from the pipe-main $p$.

At the completion of the second stage the cocks are set to the position as shown in Fig. 3, to adapt the apparatus to carry out the third stage of the process. The communications thereby established are such that the last portion of alcohol as it is distilled off from the still $a$ passes through the condenser $d$ as in the second stage and thence into the separator $m$ where it is collected. Both sets of absorption vessels, during this stage are cut off from communication with the pipe-main $p$, and the exhaust pump communicates directly through the pipe-main with the vessel $m$ and thence, by way of the condenser, with the still. Under these conditions the aroma-charged fluids in the absorption vessels may be withdrawn through the drain-faucets shown at the bottom of the absorption vessels and a fresh supply of alcohol-free liquid may be introduced into these absorption vessels. These vessels may thus be prepared for charging a fresh supply of non-alcoholic liquid with the aromatic substances, without interrupting the process at any stage.

During the progress of the third stage or the previous stages the still $a$ which is not in operation (in the present case the right-hand still) may be charged with alcoholic liquor containing aromatic substances to be preserved, so as to be ready at once to resume the first stage of the process after the completion of the third stage, by simply turning the three-way cock $c^6$ a quarter turn in the direction of the hands of a clock, thereby cutting out the left-hand still $a$ and putting the right-hand still $a$ into communication with the pipe-main $p$.

The aroma-charged liquids from the absorption vessels may now be mixed so as to obtain a liquor free from alcohol, but containing all the aromas originally in the alcoholic liquor serving as the starting material in the process. The natural bouquet of the original liquor is thus preserved. Moreover, by mixing the two absorption liquids of varying proportions beverages of varying qualities and adapted to varying tastes may be obtained. As the separator $m$ becomes filled with condensed alcohol the same may be drained from the separator into the collecting vessel or receiver $n$ by opening the cock $c^7$, and from the receiver the same may be drawn off by the exit pipe $n^2$, at the bottom.

By my invention not only are all the aromatic substances of the original alcoholic liquor preserved and made part of an alcohol-free beverage, but the process may be carried on continuously and without interruption when passing from one stage to the other and when beginning a new cycle of operations and recharging the stills and the absorption vessels, and the loss of aromas through the exhaust pump is entirely obviated.

What I claim and desire to secure by Letters-Patent is:

1. The process which consists in separately distilling the aromatic products more volatile than alcohol and those evaporating with the alcohol from an alcoholic liquor, separately collecting them, and combining all of them with alcohol-free liquid to form a non-alcoholic liquor containing substantially all the aromatic substances contained in the alcoholic liquor.

2. The process which consists in extracting in separate stages the aromatic substances from alcoholic liquors vaporizing alone and those vaporizing with the first portions of the alcohol, and combining them with a non-alcoholic liquor.

3. The process which consists in distilling from an alcoholic liquor containing aromatic substances the aromatic substances which distil over without the alcohol and causing them to be absorbed in a body of alcohol-free liquid, then distilling from the residue the less volatile aromatic substances together with a portion of the alcohol, condensing the alcohol to separate the same from the aromatic vapors and causing the said aromatic vapors to be absorbed in a second body of alcohol-free liquid.

4. The process which consists in distilling from an alcoholic liquor containing aromatic substances the aromatic substances which distil over without the alcohol and causing them to be absorbed in a body of alcohol-free liquid, then distilling from the residue the less volatile aromatic substances together with a portion of the alcohol, condensing the alcohol to separate the same from the aromatic vapors and causing the said aromatic vapors to be absorbed in a second body of alcohol-free liquid, and finally distilling off the balance of the alcohol remaining in the residue left after the second distilling step.

5. The process which consists in distilling from an alcoholic liquor containing aromatic substances the aromatic substances which distil over without the alcohol and causing them to be absorbed in a body of alcohol-free liquid, then distilling from the residue the less volatile aromatic substances together with a portion of the alcohol, condensing the alcohol to separate the same from the aromatic vapors and causing the said aromatic vapors to be absorbed in a second body of alcohol-free liquid, and finally distilling off the balance of the alcohol remaining in the residue left after the second distilling step, and then mixing the two bodies of aroma-charged alcohol-free liquids.

6. The process which consists in subjecting an alcoholic liquor containing aromatic substances, to heat and low-pressure to distil from the same the volatile substances which pass over without the alcohol and causing the same to be absorbed in a body of alcohol-free liquid, then increasing the heat and reducing the pressure to distil therefrom those volatile substances which pass over with the alcohol, condensing the accompanying alcohol, to separate it from the volatile products and causing the said volatile products to be absorbed in a second body of alcohol-free liquid, and finally distilling off the balance of the alcohol remaining in the residue after the second distilling step.

7. The process which consists in subjecting an alcoholic liquor containing aromatic substances to heat and low-pressure to distil from the same the volatile substances which pass over without the alcohol and causing the same to be absorbed in a body of alcohol-free liquid, then increasing the heat and reducing the pressure to distil therefrom those volatile substances which pass over with alcohol, condensing the accompanying alcohol to separate it from the volatile products and causing the said volatile products to be absorbed in a second body of alcohol-free liquid, then distilling off the balance of the alcohol remaining in the residue after the second distilling step, and then mixing the two bodies of charged alcohol-free liquid.

8. In an apparatus for preparing alcohol-free beverages, the combination of a still, an exhaust pump and a pipe connecting the still and the pump, with two separate absorption vessels independently connected to the pipe, means for separately cutting off or establishing the communication between the absorption vessels and the pipe, a condenser connected to the pipe and means to cut off or establish the communication between pipe and condenser, a separating vessel communicating with the condenser and with the pipe, and means to cut off or establish the communication between the separating vessel and the pipe.

9. In an apparatus for obtaining alcohol-free beverages, the combination of a pipe and a pair of stills, means for connecting one of the stills to the pipe and cutting the other off therefrom, and vice versa, and an exhaust-pump communicating with the pipe, with two separate absorption vessels independently connected to the pipe, means for separately cutting off or establishing the communication between the absorption vessels and the pipe, a condenser connected to the pipe and means to cut off or establish the communication between pipe and condenser, a separating vessel communicating with the condenser and with the pipe, and means to cut off or establish the communication between the separating vessel and the pipe.

10. In an apparatus for preparing alcohol-free beverages, the combination of a pipe-main, a still and an exhaust pump each connected to the pipe-main, with a condenser and pipe connecting the same with the pipe-main, a separating vessel connected with the condenser and with the pipe main, two absorption vessels and pipes separately leading from the pipe-main to the absorption vessels, and pipes separately leading from the absorption vessels to the pipe main, three-way cocks being arranged in the pipe-main at the points leading from the pipe-main to the condenser, and to the absorption-vessels and from the separating vessel and from the absorption-vessels to the pipe-main.

11. In an apparatus for preparing alcohol-free beverages, the combination of a pipe-main, a pair of stills connected with the pipe-main, a three-way cock at the connecting point between the said stills and the pipe-main and an exhaust pump also connected to the pipe-main, with a condenser and pipe connecting the same with the pipe-main, a separating vessel connected with the condenser and with the pipe main, two absorption vessels and pipes separately leading from the pipe-main, to the absorption vessels, and pipes separately leading from the absorption vessels to the pipe-main, three-way cocks being arranged in the pipe-main at the points leading from the pipe-main to the condenser and to the absorption-vessels and from the separating vessel and from the absorption vessels to the pipe-main.

CARL REINHARD WAGNER.

Witnesses:
HERMAN PLISCHKE,
MATT FIERCHE.